UNITED STATES PATENT OFFICE.

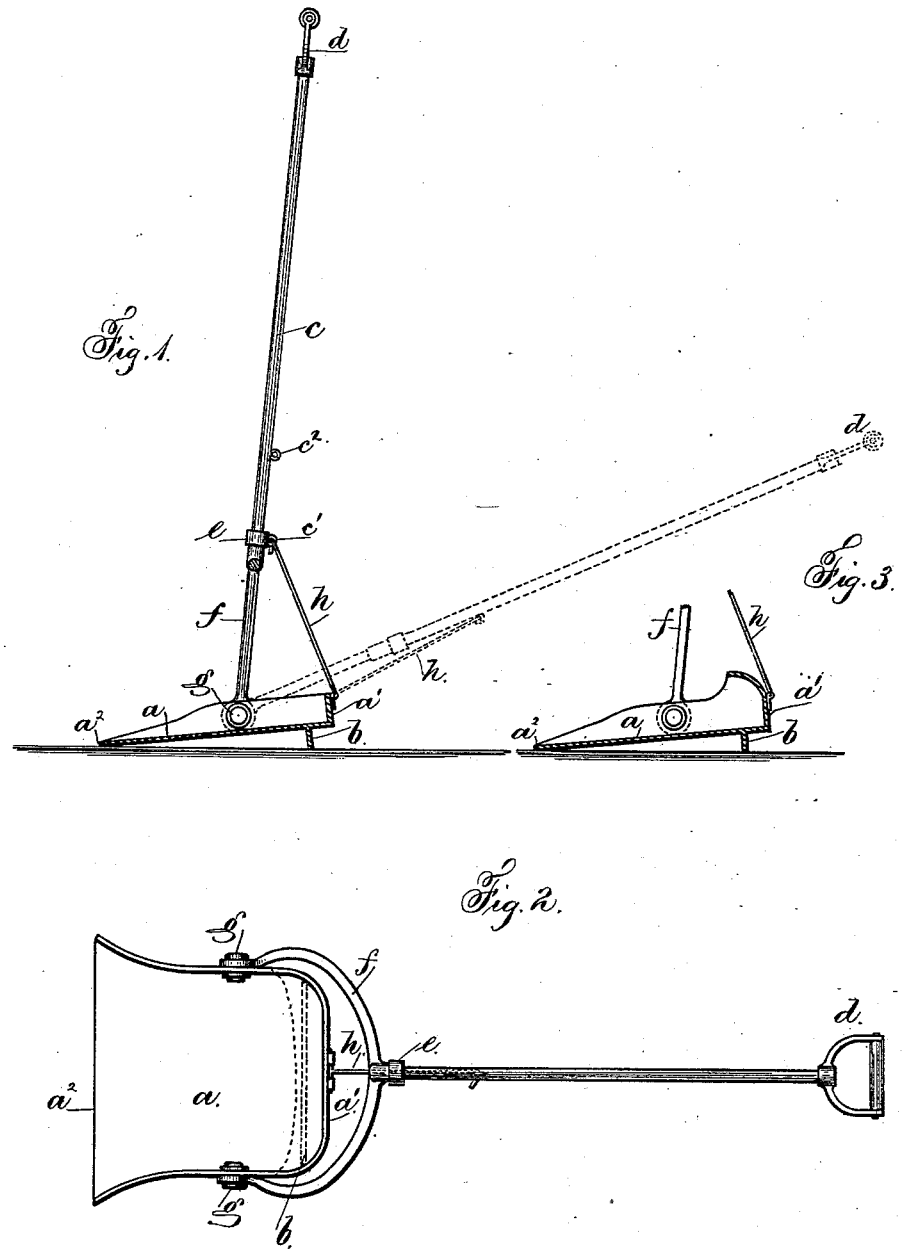

FRANCIS W. CARPENTER, OF HARRISON, NEW YORK.

DUST-PAN.

SPECIFICATION forming part of Letters Patent No. 277,225, dated May 8, 1883.

Application filed April 2, 1883. (No model.)

*To all whom it may concern:*

Be it known that I, FRANCIS W. CARPENTER, of Harrison, in the county of Westchester and State of New York, have invented an Improvement in Dust-Pans; and the following is declared to be description of the same.

Dust-pans having long handles have heretofore been made, their object being to prevent the necessity of persons stooping to the floor to remove the sweepings, and these dust-pans have been made to fold forward upon the handle when set aside or hung up out of the way after use, the connection to the pan being made on the back wall.

My invention has for its object the holding of the pan while dust is being swept into it and the folding of the handle into line, or nearly so, with the dust-pan. I employ a pan with a single inclined bottom, and a rest to raise the back part off the floor, and a long handle, and bail to connect said handle and the pan together, the bail being fastened to the sides of the pan at or near the center line; and I provide a rod or brace hinged at the back of the pan, and having a hook on the other end to connect with an eye on the handle and hold said handle in the position for use, or to hook into a second eye for holding the pan close to the handle for setting aside or hanging up.

In the drawings, Figure 1 is an elevation and partial section of my improved dust-pan. Fig. 2 is a plan of the same, and Fig. 3 is a section of a modified form of pan.

The pan portion $a$ is preferably of the shape shown in Fig. 2, and may be made of any desired metal, and said pan is provided with a rest, preferably of sheet metal, at $b$, the same extending across the bottom of the pan $a$, as shown in dotted lines, Fig. 2. The back $a'$ of the pan, instead of being low and of the shape shown in Fig. 1, can be arched over, as shown in Fig. 3, to prevent dust and other particles escaping over the back of the pan as swept into it. The long handle $c$ is at its end provided, by preference, with a bail and cross-bar, $d$, for the hand to grasp in use. The other end of handle $c$ fits into a thimble, $e$, formed as part of the bow or bail $f$, and the ends of said bail $f$ are connected preferably by rivets to the sides of the dust-pan $a$ at $g$. I prefer to employ a washer on each side in connection with the rivet, and to connect the bail on the outer sides of the pan, although I may make said connection on the inside with almost equal advantage. The wire or rod $h$ is hinged or otherwise connected with the back wall of the pan at the upper edge, and the free end of said rod $h$ is made with a hook to enter either screw-eye $c'$ or $c^2$ on the handle $c$.

In the position of the dust-pan and handle shown in Fig. 1 by full lines the parts will stand alone and are ready for use, and in the position of the handle, Fig. 1, in dotted lines, the pan can also be used by stooping slightly, and the parts are in position for setting the pan aside or hanging it up out of the way. In this case the pan is not folded up against the handle, as described in the recital to this specification, but the back is brought up nearer the handle and held in position by the rod $h$.

The great advantage of hinging the bail $f$ on the sides of the dust-pan at or near the center line of the pan and midway between the edge of the pan and the rest $b$ upon the floor is that in use a pressure upon the handle causes the edge at $a^2$ to set closely to the floor or carpet, causing the sweepings to be easily and thoroughly transferred to the pan, and the rod $h$ makes positive the relative positions of the handle and pan, enabling the person sweeping to carry the pan about without spilling its contents. In both positions shown in Fig. 1 the pressure exerted by the bail $f$ is the same, the rod $h$ aiding the leverage of the handle in pressing the pan upon the floor.

My improved handle, bail, and rod connection to the back of the pan can be employed with equal advantage upon a pan with a double-inclined bottom or with or without the curved cover shown in Fig. 3.

The pan $a$ should be of sheet metal that will bend or yield upon pressure of the handle $c$, and said handle can be secured to the central portion of said pan, so that said pressure can be applied as stated. The rest $b$ may be made of cast metal riveted to the pan $a$.

I claim as my invention—

1. The combination, with the dust-pan $a$ and rest $b$, of the handle $c$, bail $f$, and rod $h$, as and for the purposes set forth.

2. The combination, with the dust-pan $a$ and rest $b$, of the handle $c$ and bail $f$, the said bail being pivoted to said pan $a$ on the sides of the same and between the front edge, $a^2$, and rest $b$, as and for the purposes set forth.

3. The combination, with the dust-pan $a$ and rest $b$, of the long handle $c$, the bail $f$, pivoted to the sides of the pan $a$, the hooked rod $h$, hinged to the back of the pan and connected to the eye $c'$ or $c^2$ upon the handle $c$, as and for the purposes set forth.

4. The combination, with the dust-pan, of a rest beneath the back portion to raise the same, and a handle secured to the pan between the front edge and said rest, whereby pressure on the handle causes the edge to set closely to the floor, substantially as specified.

5. The combination, with a dust-pan, of a bail connected to the same between the front edge and the back, and a handle upon such bail, whereby the pressure upon the handle causes the front edge of the pan to set closely to the floor, substantially as specified.

Signed by me this 31st day of March, A. D. 1883.

FRANCIS W. CARPENTER.

Witnesses:
GEO. T. PINCKNEY,
CHAS. H. SMITH.